US009135021B2

(12) United States Patent
Adema et al.

(10) Patent No.: US 9,135,021 B2
(45) Date of Patent: Sep. 15, 2015

(54) METHOD AND SYSTEM FOR INPUT AND OUTPUT OF DATA WITH NON-STANDARD I/O DEVICES FOR WEB APPLICATIONS

(75) Inventors: Roger Lee Adema, Raleigh, NC (US); John Christian Fluke, Oxford, NC (US); Jarrad Andrew Giles, Raleigh, NC (US); Richard Gaines Whitley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 3043 days.

(21) Appl. No.: 10/609,981

(22) Filed: Jun. 30, 2003

(65) Prior Publication Data

US 2005/0021886 A1    Jan. 27, 2005

(51) Int. Cl.
G06F 15/16 (2006.01)
G06F 9/44 (2006.01)

(52) U.S. Cl.
CPC .............. *G06F 9/4443* (2013.01); *G06F 15/16* (2013.01)

(58) Field of Classification Search
None
See application file for complete search history.

(56) References Cited

U.S. PATENT DOCUMENTS

| 6,375,078 | B1 | 4/2002 | Russell et al. | |
|---|---|---|---|---|
| 6,745,259 | B2* | 6/2004 | Wagner | 710/33 |
| 6,868,433 | B1* | 3/2005 | Philyaw | 709/203 |
| 6,873,984 | B1* | 3/2005 | Campos et al. | 707/6 |
| 2002/0032810 | A1 | 3/2002 | Wagner et al. | |
| 2002/0071076 | A1 | 6/2002 | Webb et al. | |
| 2002/0169686 | A1 | 11/2002 | Zweben et al. | |
| 2002/0198791 | A1 | 12/2002 | Perkowski | |
| 2003/0061021 | A1* | 3/2003 | Sakai et al. | 704/1 |

FOREIGN PATENT DOCUMENTS

| JP | 2000267966 | 9/2000 |
|---|---|---|
| JP | 2004297203 | 10/2004 |

OTHER PUBLICATIONS

Symbol Technologies, Inc., *Spectrum 24® Web Client for Windows CE Administrator's Guide*, 72E-42156-02, Revision A, Sep. 2002.
Search Report from Foreign Patent Office, Cited in Jun. 3, 2008 JPO Office Action, 1 page.
Symbol Technologies, Inc. "Spectrum 24(R)Web Client for Windows CE Administrator's Guide", 72E-42156-02, Revision A, Sep. 2002, 198 pages.
IBM Dossier: GB919990142, "A Method for Acquiring Data from a POS Device", IBM Confidential, Mar. 17, 2003, 1 page.

* cited by examiner

*Primary Examiner* — Tony Mahmoudi
*Assistant Examiner* — Tuan-Khanh Phan
(74) *Attorney, Agent, or Firm* — Jeffrey L. Streets

(57) ABSTRACT

Method for input and output of data with non-standard I/O devices for web and other applications is presented. In one aspect, non-standard input data is received from the non-standard input device at a client, and the non-standard input data is provided as equivalent standard input data to the standard browser running on the client, so that the standard browser can submit the input data to an application running on a server in communication with the client over a network.

20 Claims, 4 Drawing Sheets

METHOD AND SYSTEM FOR INPUT AND OUTPUT OF DATA WITH NON-STANDARD I/O DEVICES FOR WEB APPLICATIONS

FIELD OF THE INVENTION

The present invention relates to the input and output of data to computer systems, and more particularly to the input and output of data with non-standard I/O devices for World Wide Web applications and pages.

BACKGROUND OF THE INVENTION

World Wide Web applications are commonly used in a variety of tasks that involve the communication of data over the network such as the Internet. In many applications, web applications running on a server or other computer retrieve data from client devices by presenting a form or other type of web page. The data can include information that can be input into the forms that are displayed on the client computer display using a standard web browser program, such as Internet Explorer from Microsoft or Netscape from Netscape Communications. The web forms often include a number of fields or blanks which ask for specific information from the user. It is simple for the user to determine the information requested by each field, and to enter that information using input devices.

Traditionally, users can input data into these web forms using standard input devices, such as a keyboard, mouse, trackball, etc. For example, a user can move a mouse or trackball to position a cursor on an empty field within the form and type the information into the field using a keyboard input device. Similarly, a keyboard key, such as TAB, can be used to move the cursor from field to field on a form.

"Non-standard" input devices can be used by some users to input data to computer systems. For example, a computer can be used at a business or other entity that sells or tracks inventories of items. The information concerning sold goods or stored inventories can be input to the computer to maintain a database. In these types of applications, Point-of-Sale (POS) I/O attachments can be used to easily input data concerning the goods or inventories. For example, at a retail store, a clerk can scan a bar code or other coded mark on a product with an optical scanner, which reads the coded information and sends the information to a computer to be stored and manipulated. In other environments, a magnetic stripe reader (MSR) can be used to magnetically read data from a magnetic stripe provided on a card (such as a credit card) or other item.

These types of non-standard input devices allow data to be quickly and easily input to computer systems and allow fast inventorying and sale of goods. However, there are no simple and easy ways for a user to enter data that is read from a scanner or MSR input device into a web form provided in a browser program running on the computer. The user must manually enter the information into the fields of the web form, causing much delay and expense for simple input tasks. Web servers and forms, however, are commonly used in many businesses, e.g., on a local area network or the Internet.

In one attempted solution, Symbol Technologies, Inc. has created a custom web browser that supports additional attributes on otherwise standard HTML tags, such as a custom input tag. This can allow attributes in the web page that permit a scanner, for example, to input data to the custom browser. However, since the browser itself must be modified for this application, only a limited number of platforms are able to run the browser and achieve this functionality, and it may not support all the existing standards. What is needed is a more robust, flexible, and platform-independent way to input and output data from non-standard input and output devices to and from computers.

SUMMARY OF THE INVENTION

The invention of the present application provides an apparatus and method for input and output of data with non-standard I/O devices for web and similar applications. In a first aspect of the present invention, a method for providing input data from a non-standard input device to standard browser includes receiving non-standard input data from the non-standard input device at a client, and providing the non-standard input data as equivalent standard input data to the standard browser running on the client, so that the standard browser can submit the input data to an application running on a server in communication with the client over a network. In a second aspect, a system for providing input data from a non-standard input device to standard browser includes a client operative to receive non-standard input data from the non-standard input device and provide the non-standard input data as equivalent standard input data to the standard browser running on the client, and a server running an application and in communication with the client over a network, the application operative to receive the input data submitted from the standard browser running on the client. In a third aspect, a computer readable medium includes program instructions to be implemented by a computer for providing input data from a non-standard input device to standard browser, the program instructions performing steps including receiving non-standard input data from the non-standard input device at a client, and providing the non-standard input data as equivalent standard input data to the standard browser running on the client, so that the standard browser can submit the input data to an application running on a server in communication with the client over a network. In a fourth aspect, a method for providing output data to a non-standard output device includes receiving at a server a request from a user, the request requesting data to be sent from the server to a client in communication with the server, and sending the data and instructions to the client, the instructions governing how the data is to be output to a non-standard output device. A standard browser running on the client receives the data and instructions and the data can be sent according to the instructions to be output by the non-standard output device in communication with the client.

The present invention provides methods and apparatus for input and output of data with non-standard I/O devices for web and other applications. The client's browser need not be modified in any way, allowing input from and output to non-standard devices to be easily and flexibly achieved. Furthermore, the present invention permits efficient communication between the client and server to allow the server to receive non-standard input and command non-standard output with little or no performance degradation.

DETAILED DESCRIPTION

The present invention relates to the input and output of data to computer systems, and more particularly to the input and output of data with non-standard I/O devices for World Wide Web applications and pages. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
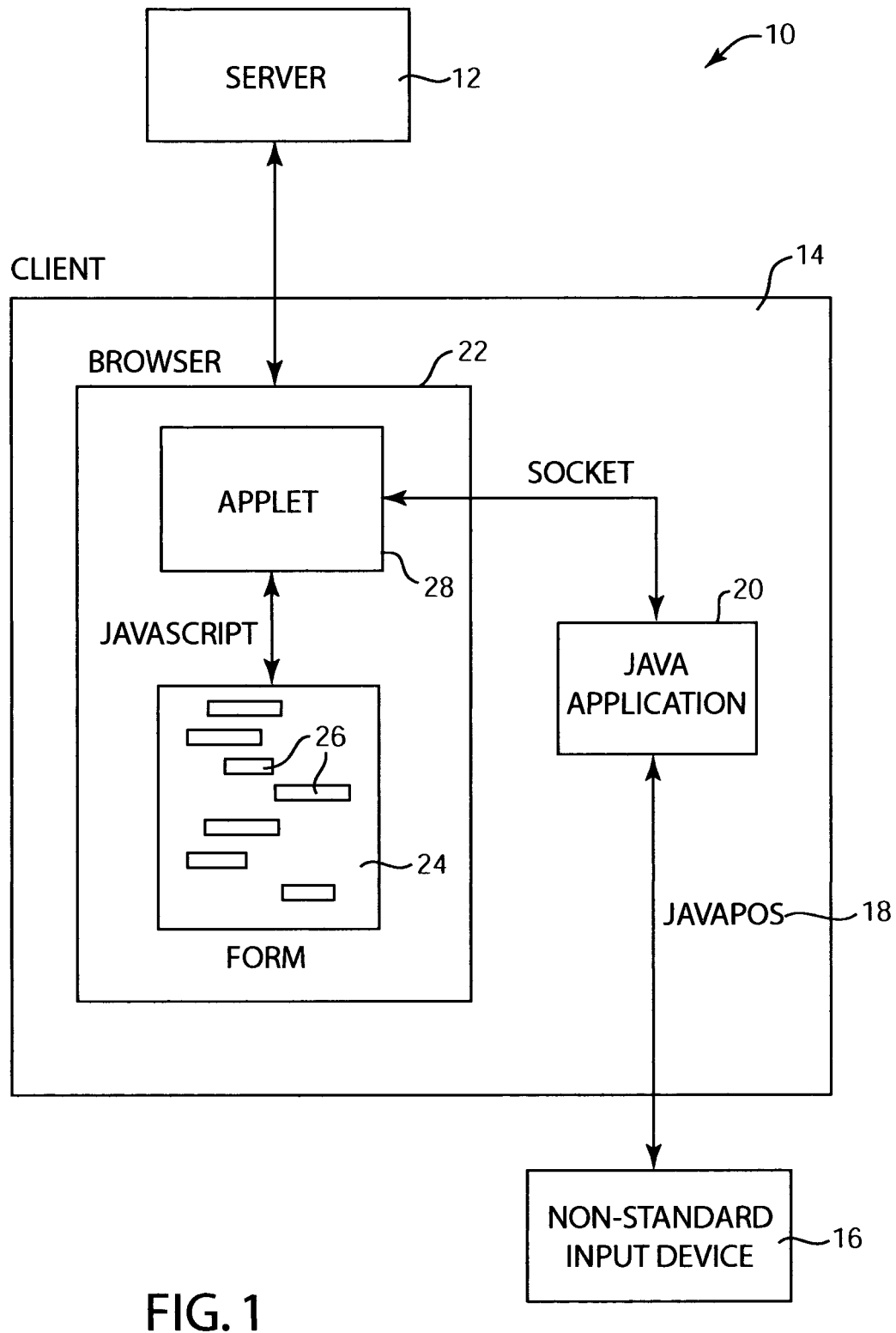
FIG. 1 is a block diagram of a system of the present invention for providing data from a non-standard input device to a standard browser.

FIG. 1 is a block diagram of a system 10 suitable for use with the present invention. System 10 includes a server 12, a client 14, and a non-standard input device 16. Server 10 can be a web server that runs a web application which can provide data to other computers over a network, such as the World Wide Web/Internet or a local area network (LAN), and perform other functions. The server 12 runs server programs to send out and receive data according to standard network protocols and in standard formats. For example, one preferred implementation is that server 12 includes a Java Server Pages™ engine and implementation. As is known to those of skill in the art, Java Server Pages (JSP) technology is an extension of the Java™ servlet technology from Sun Microsystems, Inc. Java servlets are platform-independent, server-side programs and modules that run on a Web server and build web pages on the fly. Java Server Pages (JSP) functionality allows a web programmer to mix regular, static HTML code with dynamically-generated HTML code and is a simplified way to create web pages instead of only using servlets to create the pages. JSP pages use XML tags and scriptlets written in the Java programming language. JSP pages are not restricted to any specific platform or web server.

JSP tags are XML-like tags that encapsulate logic that can generate the content for a web page or otherwise modify the appearance or behavior of the web page that contains the tag. Additionally, the application logic can reside in server-based resources that the page accesses with the JSP tags. The JSP specification includes many standard library tags for many different functions and applications. Custom tags, used in the present invention, are used as extensions to the JSP language to provide custom dynamic functionality.

In the described embodiment of FIG. 1, the server 12 preferably runs a number of custom JSP tags to provide, in part, the functionality of the present invention (applets and standalone applications provide additional functionality, as described below). Specifically, a JSP custom tag can be provided on the server 12 to generate instructions that are downloaded to clients. This is described in greater detail below.

In alternate embodiments of the invention, JSP tags need not be used. For example, JavaScript™ statements, or statements in a different language, can be directly used to implement the same functionality as the JSP tags in the described embodiments (in actuality, JSP tags generate JavaScript statements).

Client 14 is a computer or electronic device that can communicate with the server 12 over a network such as the World Wide Web. Client 14 can communicate with the server 12 via standard network cables or wires, or by a wireless technology. Client 14 can be a web client that is used primarily for downloading and displaying web pages, or a more general-purpose computer that can perform a variety of other tasks. For example, the client 14 can be used in a warehouse or store setting where it is used only for inputting inventory and cataloguing information, which is sent to and stored on the server 12. The programs and processes running on the client 14 are described in greater detail below. Some common implementations of client 14 include a portable computer, such as a palm-pilot, personal digital assistant (PDA), and laptop computer, or a desktop computer, terminal, or workstation. Client 14 includes a display device (monitor, LCD flat screen, etc.) which displays web pages and other information to the user.

A non-standard input device 16 is in communication with the client 14, where data can be communicated from the device 16 to the client 14 via a connection including connecting wires, or wirelessly (optical, radio communication, etc.). In some embodiments, data can also be transmitted from the client 14 to the device 16 for configuration of the device, etc. Input device 16 is "non-standard" since it is not a keyboard, mouse, trackball, touch screen, or other input device commonly used to input data to a web browser or similar program on client 14 (although such standard input devices can also be in communication with the client 14 in the present invention, not shown in FIG. 1). Two non-standard input devices 16 of particular relevance to this embodiment of the present invention are a scanner and a magnetic stripe reader (MSR). A scanner, such as a bar code scanner, can read coded or other forms of information marked on physical objects, such as bar codes, patterns, etc. Typically, a scanner uses optical mechanisms to read the information by moving the reading portion of the scanner over the marked information on an item. Many scanners are handheld devices, allowing easy input of data from items. Many other types of scanners can also be used. MSR devices are used to read information from the magnetic stripes provided on cards or other objects, such as credit cards, ATM cards, etc. A user need only slide the card edge having the magnetic strip through the reader device to read the information. Many MSR devices can read from multiple and independent tracks of data provided in a magnetic stripe. Other types of non-standard input devices 16 can be used in other embodiments, such as "pin-pads" (keypads), smart-card readers, etc.

The non-standard input device 16 provides data that has been read by the device 16 to the client 14. In the described embodiment, the client 14 (e.g., standalone application 20) runs device driver software that allows the communication with non-standard input device 16. For example, the device drivers can be implemented in JavaPOS™, which is a widely-used, platform independent standard developed for Point-of-Sale (POS) environments and applications, e.g., for use with devices commonly provided at retailers and other businesses, such as a scanner, POS terminal, MSR device, etc., to allow these devices to communicate with other computer applications in a standard way. Other types of appropriate device drivers can be used in other embodiments.

An application program 20 is preferably running on the client 14 which receives the data that was read by the device drivers 18. This application program 20 can be a standalone application that provides the data from the non-standard input device over a socket to a browser 22 running on the client 14. In the described embodiment, application program is a Java application that is platform-independent, since this allows its use of JavaPOS to read the data from the non-standard input device 16; however, in other embodiments, the application can be provided in any desired programming language that has the appropriate device drivers and which can open a socket to the applet in the browser (described below).

Web browser 22 can run on the client 14 and provides a user of the client 14 with an interface for displaying information and/or interacting with the client 14, server 12, and any other connected computers. Browser 22 can receive information over a network and render and display the information in a predetermined format according to a standard language or protocol, such as HTML and/or XML which is used for displaying information in web pages transmitted over the World Wide Web, and can send data and web pages to other computers over a network. Browser 22 is a "standard" browser, i.e., a browser readily available and used currently for web browsing, and which communicates over an http connection, but which does not typically include any interface for receiving data from non-standard input devices 16. Typical standard browsers include Netscape from Netscape Communications Corp., and Internet Explorer from Microsoft Corp.

In a preferred embodiment, browser 22 displays a web page that is a web form 24 derived from "page data" downloaded from the server 12. Form 24 can take any of a variety of formats and appearances. For example, one format provides a number of fields 26 in the form 24 in which data can be entered. For typical forms, a user must enter data into each field using standard input devices such as a keyboard or mouse. The present invention allows a user to enter information from a non-standard input device 16 into appropriate fields of the form 24.

In the described embodiment, browser 22 is running one or more applets 28. Similar to a servlet, a Java applet is a platform-independent program running on the client (instead of the server) which can be downloaded by the client. Applet 28 is configured to receive the data from the standalone application 20 over the socket and to put that data into the appropriate fields 26 of the form 24 displayed by the browser. The applet can use a standard interface or protocol for filling the fields of the form. For example, in one described implementation, LiveConnect™ can be used, which is a JavaScript-applet interface defined by Netscape Communications, Inc. for the Netscape browser. Other standard interfaces can alternatively be used. In the described embodiment, the applet is configurable through instructions using a set of public setter methods that allow JavaScript functions to specify which form and field should be the destination of particular data. The applet 28 can also optionally "submit" (post) a completed form 24, i.e., send the form data to the web program running on the server 12. In one implementation, a different applet can be running for each type of non-standard input device 16 that inputs data to the client 14. In other implementations, a single applet 28 can handle data from multiple types of non-standard input devices 16.

Preferably, the web program running on the server 12 can provide configuring information, i.e., instructions, such as a script, to configure the applet 28 running in the browser. For example, one or more custom JSP tags and/or public JSP methods on the server can be processed by a JSP engine to generate instructions that are sent down to the browser 22 by the server 12. The instructions, when executed, identify particular forms and fields in the forms that should receive data from particular non-standard input devices, and this configuring information can be used by the applet 28 after the browser 22 has rendered the web page from the data sent by the server 12. This configuring information is in addition to the HTML and other standard web page data that is downloaded to the browser to cause the web form to be rendered and displayed. For example, the configuring instructions can use JavaScript functions to cause the applet to perform the functionality described above. Instructions in other languages or formats can alternatively be used.

The present invention allows a user to input data from a non-standard input device to a standard browser and from the browser to a web application on a server, using a platform-independent interface and standard web technology (e.g., HTML, Java plug-ins, JavaPOS, JavaServerPages, or equivalent technology). The browser need not perform any special functions, and need not even know that the data it is receiving was received from a non-standard input device; the applet and standalone application (in the described embodiment) take the non-standard input data and provide it as standard data to the browser. This allows the maximum flexibility for users using existing technology. Furthermore, any programmer of the web application on the server can easily place a custom JSP tag of the present invention (described below) in the web application, which will cause a form to be generated and the input data from a non-standard device to fill in the form.

This embodiment of the present invention also offers significant advantages over an implementation that provides the input data from the non-standard input device 16 directly over a socket to the server 12. In the described embodiment, it is transparent to the web application on the server 12 that the source of the data it is receiving is the non-standard input device 16, since the data is coming over the standard "http" connection of the browser/applet with the form. If the input data were provided from the input device directly to the server 14 over a different, non-standard socket, the web program would have to coordinate the non-standard input data socket with the standard http socket of the browser, over which the form is being received, causing the web program to have to cache data and causing greater inefficiency. Also, many firewalls in networks will not allow network traffic over a non-standard port.

Examples of Custom JSP Tags

Examples of custom JSP tags and other resources suitable for use with the present invention are listed below. Similar functionality to these tags and resources can be obtained using other standards and computer languages. The custom JSP tags presented below replace standard "form" tags used in JSP. The custom tag is a wrapper for the <form> tag so that, in addition to the custom attributes, it can also take the typical form attributes such as "action" and "method." Also, this implies that one can put any statements between the start and end tags of this custom tag that one can put between the start and end tags of a standard form tag.

An example of syntax for a <scanner> tag that can be used in the present invention for the input of data from a scanner to the browser 22, is presented below in JSP tag format.

```
<customTagName: scanner
    form= "formName"
    frame= "frameID"
    field= "fieldID"
    autoPost= "true|false"
    action= "action"
    method= "method" >
    .
    . (body of form)
    .
</customTagName: scanner>
``` where

"form" identifies the generated form, i.e., this value is used as the "name" and "ID" attributes of the form;

"frame" is the identification of the frame which contains the web form;

"field" is the ID of the input field which is to receive the data. Note that this field is referenced here, but is not generated, and needs to be defined and characterized in the body of the <scanner> tag;

"autoPost" (optional, default="true") indicates whether the form should be posted (i.e., submitted to server 12) as soon as data is received and put into the field specified in the "field" attribute;

"action" becomes the value of the "action" attribute of the generated form. The "action" attribute can specify, for example, the name of a servlet on the server 12 that processes that data input to the field; and "method" becomes the value of the "method" attribute of the generated form. The "method" attribute can specify, for example, whether to "post" a form or field or "get" a form or field.

The body of the form specifies the characteristics of input fields in the form, as well as any other features on the page, such as buttons, graphics, or other interface features. These are standard form attributes.

In addition to using the <scanner> tag as described above, several public methods of the applet can be invoked for added functionality. These methods add a great deal of flexibility and can be used in cases where there are multiple fields per form which can receive scanner data. Examples of methods are presented below. These public methods allow a JSP tag of the present invention to configure the applet 28 to apply input data from the scanner to the proper forms and fields of the form that has been rendered by the browser 22. These public methods can also be used in embodiments in which a custom JSP tag is not used.

SetFrame(String) identifies the frame containing the form and input field which is to receive the scanner data.

SetForm(String) identifies the form containing the input field which is to receive the scanner data.

SetField(String) identifies the input field which is to receive the scanner data. Each field of multiple fields in a form can have its own different identifier.

SetAutoPost(boolean) specifies whether the form should be submitted as soon as scanner data is received.

SetEnabled(boolean) specifies whether the scanner should be enabled or disabled.

A <msr> custom JSP tag can be used to identify different fields, e.g. where each field corresponds to one of the different MSR tracks, within a form which is to be the recipient of MSR data. The custom tag is a wrapper for the <form> tag so that, in addition to the custom attributes, it can also take the typical form attributes such as "action" and "method." Also, this implies that one can put any statements between the <msr> start and end tags that one can put between the equivalent form tags.

An example of syntax for a <msr> tag, used for the input of data from a magnetic stripe reader to the browser 22, is presented below in JSP tag format.

```
<customTagName: msr
    form= "formName"
    frame= "frameID"
    track1Field= "fieldID1"
    track2Field= "fieldID2"
    track3Field= "fieldID3"
```

-continued

```
    autoPost= "true|false"
    action= "action"
    method= "method" >
        .
        .   (body of form)
        .
</customTagName: msr>
``` where the "form," "frame," "autoPost," "action," and "method" attributes can be similar to the equivalent attributes described above for the <scanner> tag.

The track1Field, track2Field, and track3Field attributes are the IDs of the input fields which are to receive the data from tracks 1, 2, and 3, respectively, of the MSR. Note that these fields are specified here, but are not generated, and can be defined and characterized in the body of the <msr> tag.

The body of the form specifies the characteristics of input fields in the form, as well as any other features on the page, such as buttons, graphics, or other interface features. These are standard form attributes.

In addition to using the <msr> tag as described above, several public methods of the applet can be invoked, similar as for the <scanner> tag described above. These methods add a great deal of flexibility and can be used in cases where there are multiple fields per form which can receive MSR data. Examples of these methods are described below.

SetMSRFrame, SetMSRForm, SetMSRAutoPost, and SetMSREnabled can be used similarly to their counterparts described above for scanner use.

SetTrack1Field(String), SetTrack2Field(String), and SetTrack3Field(String) can be used to identify the input field which is to receive the MSR data from track 1, track 2, etc. (these can be set to an empty string if track data from that track is not expected).

In addition, in one example embodiment, an extra property (object) can be added to the applet 28. The extra object can be used to represent which tracks of the MSR will be relevant to the JSP page that contains the MSR tag. When the tag is loaded and the applet setter methods are called for the MSR tracks, this object can be updated to reflect that the web page includes a particular track, or not. For example, if the "track1Field" and the "track3Field" were specified, this object in the applet will represent the fact that only those tracks are relevant to the form or the web application. The value of this object is that, at a later time, the applet 28 can know which tracks to use to fill the form and send to a receiving servlet on the server 12, or that the applet can configure the MSR device 16 through the JPOS driver to only read the relevant tracks. For example, in one embodiment this object can be called "trackstoRead", and can be implemented as a java.util.BitSet object, which is a vector of Boolean values which is accessible through a getter method. Other implementations, e.g., using different languages, structures, or methods, can be provided in different embodiments.

Figure 2:
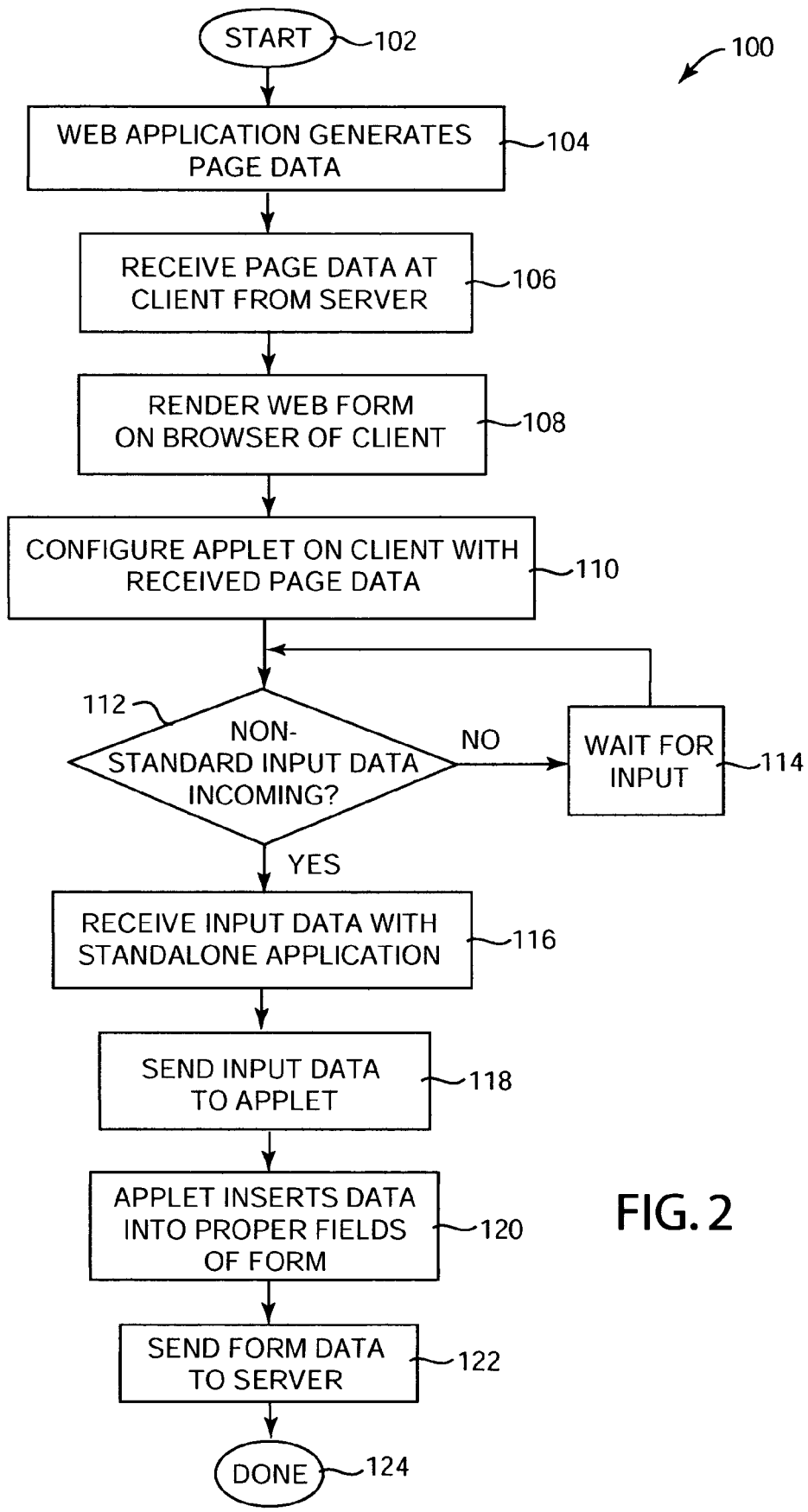
FIG. 2 is a flow diagram illustrating a method of the present invention for inputting data from a non-standard input device into a form or other web page displayed by a standard browser.

FIG. 2 is a flow diagram illustrating a method 100 of the present invention for inputting data from a non-standard input device into a form or other web page or document displayed by the client, e.g. in a standard browser. Programming instructions, data or code that implement the steps of this method (and other methods and functions described herein) can be stored in one or more computer readable media, such as memory, hard disk, magnetic tape, CD-ROM, DVD-ROM, storage device, or other medium, which is accessible to the appropriate computer or electronic devices described herein.

The process begins at 102, and in step 104, the web application on the server 12 generates the "page data", which includes the scripts or instructions needed to cause a web form to be filled in with the appropriate input data, as well as the data for the form itself. For example, in the described embodiment of FIG. 1, JSP tags generate the JavaScript instructions needed to configure the applet 28 to fill in the fields of the form, as well as generating the form and its features in HTML and/or XML.

In step 106, the page data from the web application is received at the client 14 over a communication link such as a network connection. The browser receives this page data, and it is preferable to have the applet 28 already resident and available in the browser when the page data is received. For example, the page data can be downloaded into a frame of the browser separate from the frame containing the applet. In step 108, the browser 22 renders and displays the web form 24 from the page data received from the web application. The browser interprets the standard HTML and other standard instructions in the page data. In step 110, the applet 28 running in the browser 22 is configured by instructions provided in the page data (originally generated by the JSP tag and using public functions as described above), so that the applet will know which fields of the form 24 to put any data that is input by the non-standard input device 16.

In step 112, the process checks whether any non-standard input data, which herein refers to input data from a non-standard input device 16, is being received by the client 14. If not, the process waits for the non-standard input data at step 114 (and the client performs any other standard functions). Once non-standard input data is being input to the client, in step 116 that input data is received by the standalone application 20, e.g., a Java application using JavaPOS. In step 118, the application 20 sends the input data to the applet over the socket (the socket preferably having been established during applet initialization). In step 120, the applet inserts the input data into the proper fields of the form 24, using the instructions (rules and functions) provided by the web application. The browser 22 can optionally display the input data in the proper fields in the display of the form 24, or the fields can be defined as "invisible" so that the input data is not displayed. For example, one embodiment can use the following JavaScript code (or equivalent code) to cause the applet 28 to put scanner data into a form and post the form:

```
JSObject win = JSObject.getWindow(this);
win.eval("var form = opener" + frame +
".document.getElementById(\"" +
form + "\");");
win.eval("form." + field + ".value = " + dataString + ";");
If (autoPost) {
    win.eval("form.submit( );");
}
```

This code essentially causes an object called "win" to be used to reference a particular field in the particular form and frame of the browser that is specified in the JSP tag instructions received by the applet and which is to be filled with incoming scanner data, referenced by "dataString," and assigned to "value." If the form is to be automatically sent to the server as indicated by the JSP tag, the form is then submitted (including the scanner data). If MSR data is input, then a particular track of data can be referenced in the incoming data and the instructions for the applet can associate particular tracks of data with particular fields in the form. Other implementations can be used in other embodiments. For example, the applet 28 can invoke JavaScript instructions and pass the incoming data to a JavaScript function, which can put the data in the appropriate fields of one or more forms.

After the applet 28 and browser 22 have received all the input data to complete the form 24 (e.g., all the fields have been filled), or when other criteria have been met or the user decides that the form is to be submitted, the user can select a command (e.g., via a button displayed on the page, or by some other command) to submit the input data in the form to the server 12 and web application. This data is sent to the server 12 in step 122. Alternatively, once the form is completely filled (or one or more other predefined criteria are met), the applet 28 can automatically send the form data to the server, without the user having to issue any manual command. The process is then complete at 124. Another form, if applicable, can then be sent to the client from the server to be filled.

Figure 3:
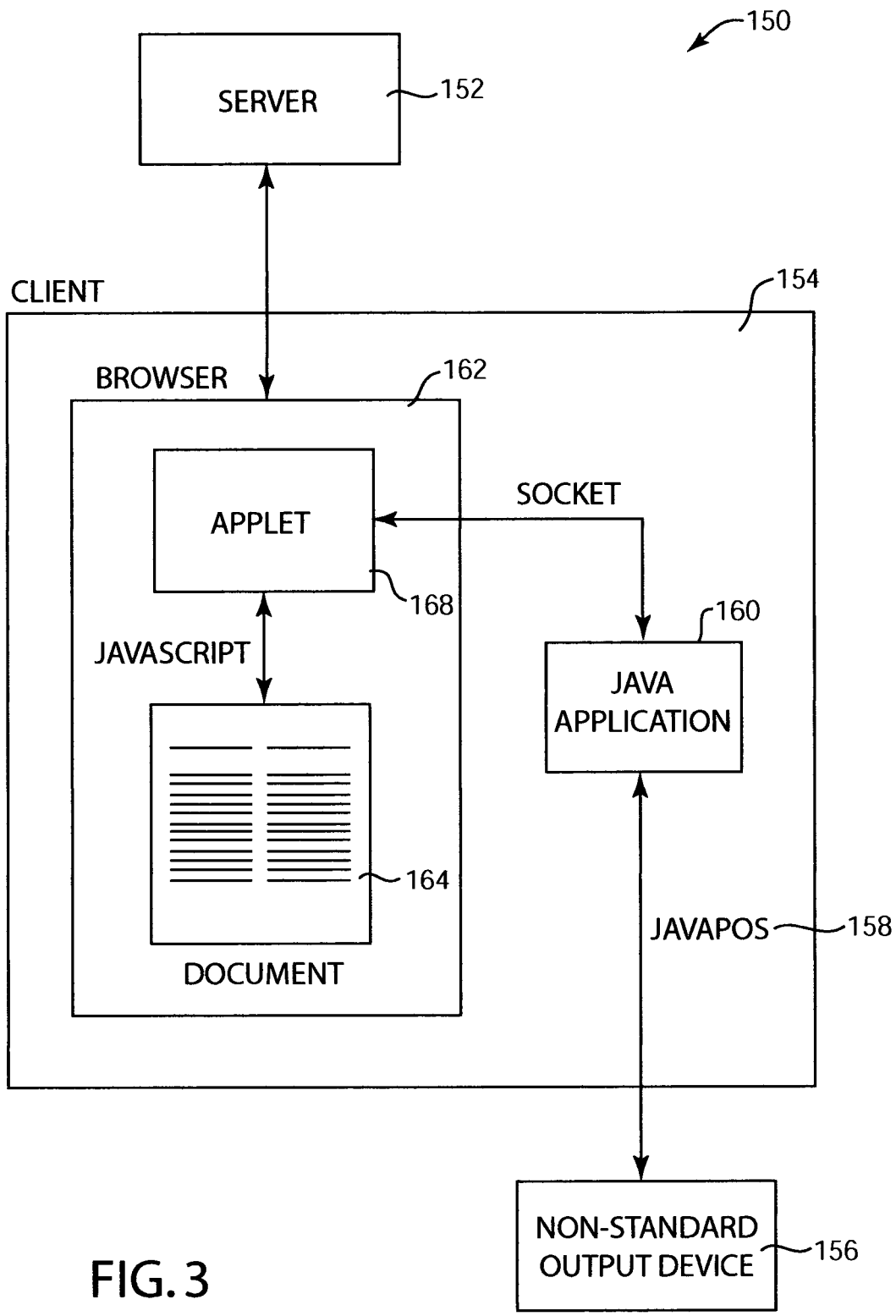
FIG. 3 is a block diagram of a system of the present invention for providing data to a non-standard output device from a standard browser.

FIG. 3 is a block diagram showing another embodiment 150 of the present invention for use with non-standard output devices. This embodiment is similar to that of FIG. 1 in many respects. System 150 includes a server 152, a client 154, and a non-standard input device 156. Server 152 can be a web server that runs a web application which can provide data to other computers over a network. A Java Server Pages and custom JSP tags implementation can be used, similar to the system 10 of FIG. 1; or, a library of JavaScript functions can be used to configure and communicate with the applet; or, functions and instructions in another language can be used. Client 154 is a computer or electronic device, preferably including a display device, that can communicate with the server 152 and can be a specialized web client or a more general-purpose computer.

A non-standard output device 156 is in communication with the client 154, where data can be transmitted from the client 14 to the output device 156 via a connection of wires or wirelessly. In some embodiments, data can also be transmitted from the output device 151 to the client 154 (status information, etc.). Output device 156 is "non-standard" in the sense that it is not a standard output device such as a display device or standard printer (laser printer, inkjet printer, etc. such as commonly found connected to computers), although such standard output devices can additionally be in communication with the client 154 in the present invention (not shown in FIG. 3). For example, one non-standard output device used in POS applications is a receipt tape printer, where specialized printing is performed by the receipt tape printer on specialized paper or tape. Other non-standard output devices can be used with the present invention in POS environments and other environments. The non-standard output device 156 receives data to be output that has been sent by the client 154.

In the described embodiment, a standalone application 160 on the client 154 can run device driver software that allows the communication with non-standard output device 156. For example, if application 160 is a Java program, the device drivers can be implemented in JavaPOS, as described above. Other types of appropriate device drivers can be used in other embodiments. Application program 160 can receive the output data that is to be sent to the device 156 from the applet 168 over a socket.

Web browser 162 can run on the client 154 and provides a user of the client 154 with an interface for interacting with the client 154, server 152, and any other connected computers. Browser 162 can receive, render and display information in a predetermined format according to a standard language or protocol, such as HTML. Browser 162 can be a "standard" browser, as described with reference to FIG. 1. Browser 162 receives and displays web page 164 from the data downloaded from the server 152. Web page 164 can include a wide variety of data.

In the described embodiment, browser 162 is running one or more applets 168. The browser receives data from the server 152 and the data is made available to the applet 168 (for example, using JavaScript functions, which may or may not be wrapped in custom JSP tags). The applet provides the data over the socket to the standalone application 160. In one implementation, a different applet can be running for each type of non-standard output device 156 that inputs data to the client 154; if multiple devices 156 are used, multiple applets can be running. In other implementations, a single applet 168 can handle data to multiple types of non-standard output devices 156 and can be configured to send to one of the devices.

Preferably, the web program running on the server 152 can configure the applet 168 running in the browser. For example, JSP tags executed using the JSP ServerPages language on the server can generate data that is sent to the browser 162 by the server 152 and instruct the applet to send all or part of the data to the output device 156.

The present invention allows a user to output data to a non-standard output device 156 from a standard browser or similar application, using a platform-independent interface and standard web technology (e.g., HTML, Java plug-ins, JavaPOS, JavaServerPages, or equivalent technology). The browser need not perform any special functions, and need not even know that the data it is displaying is to be output by a non-standard output device. This allows the maximum flexibility for users using existing products and technology.

Figure 4:
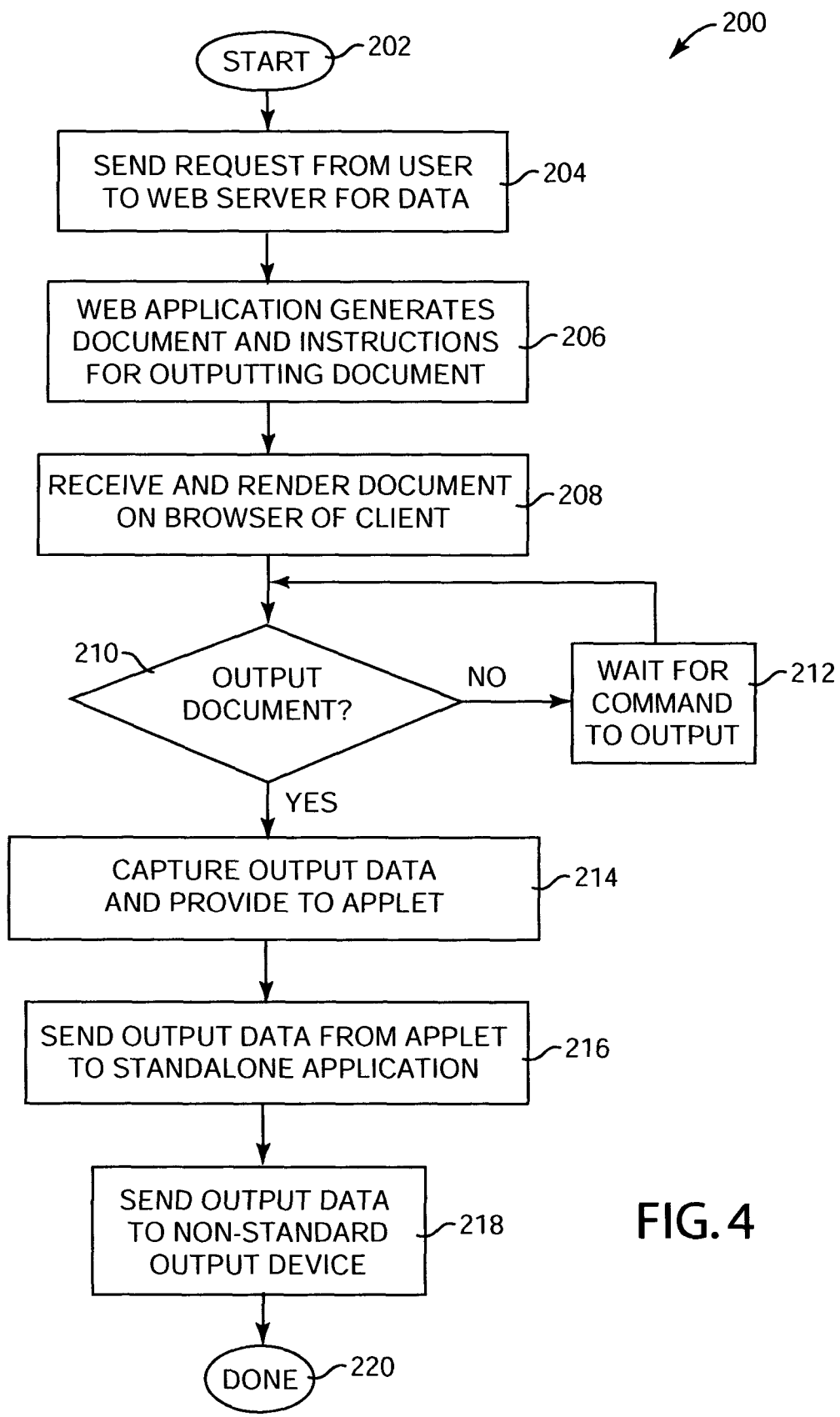
FIG. 4 is a flow diagram illustrating a method of the present invention for outputting data with a non-standard output device.

FIG. 4 is a flow diagram illustrating a method 200 of the present invention for outputting data from a non-standard output device from a document displayed by a standard browser or similar application, using a system as shown in FIG. 3. The process begins at 202, and in step 204, a request is sent by user from the client 154 to the web application on the server 152 to indicate that data is being requested by the user. For example, the user may wish to view and output a list or table of items and prices that is stored on or generated by the server, or any other information. The request can be a manual request from the user, or an automatic one based on one or more conditions.

In step 206, the web application on the server generates a "document" including the data requested by the user, and also generates instructions (e.g., JavaScript instructions or scripts) that enable the document to be output to a non-standard output device (document and instructions being collectively called "page data" herein). The web application can generate the document and instructions (e.g., using JSP tags), or can retrieve the document from stored memory or storage device accessible to the server. In the described embodiment, the web application can also provide instructions for the browser to display an output control, such as a button, which the user can select to output the document from the non-standard output device. The output control, when selected by the user, can invoke a JavaScript (or similar) function to cause the document (output) data to be provided to the applet 168, where the applet 168 sends the document to the non-standard output device. In one embodiment, custom JSP tags can be used to generate the document and instructions, similar to the custom JSP tags described above for the embodiment of FIGS. 1 and 2. For example, a "receipt tape" tag can provide the instructions to the applet 168 to provide the proper document data to a receipt tape printer 156 so that it can be printed.

In step 208, the server's page data is received by the client 154 (e.g., over a network connection or other communication link) and a document is rendered and displayed by the browser 162 from the page data. Thus, the formatted document generated by the web application in step 206 is displayed on the browser for the user to view. In some embodiments, the document from the server can be output on the non-standard device 156 without being displayed by the browser. In the described embodiment, the browser also uses the instructions in the page data to display a control, such as a graphical button, on the client to allow the document to be output by the non-standard output device when the control is selected by the user. In other embodiments, the document can be automatically sent to be output by the non-standard output device or be based on other conditions without the user issuing a command to do so, so that a graphical control need not be displayed by the browser.

In step 210, the process checks whether the document data is to be output. This can be determined in different ways in different embodiments or modes. For example, in the described implementation, the document can first be displayed and request a user confirmation that the page be output to the device 156 (e.g., the request for confirmation can be done in JavaScript). The user confirmation can be the selection of a graphical button or other control displayed by the browser. In a different implementation, no user confirmation is necessary in this step and the document is output directly.

It should be noted that the selection of the graphical button by the user as described above is not the same as selecting a "print" or other output command or function that is provided within the browser itself. The output function of the present invention exists outside the browser's functions. Some advantages of the present invention are that the data that is output by the present invention can be a subset or superset of the data that is currently displayed by the browser (or the output data may need not be displayed at all, since the output of the invention is independent of the browser's display), and can be formatted differently than the format displayed by the browser, as indicated by the instructions sent by the server (and/or by the user, e.g., in some embodiments, after the user selects an output control displayed in the browser, JavaScript instructions can act on user preferences, or the user preferences can be sent to the applet 168). Furthermore, the web applications on the server can be portable, and can provide output on a non-standard output device regardless of the specific platform of the client and the particular browser used.

If the document data is not to be output, then in step 212 the process waits for a command from the user to output the data (while the client 14 performs its regular operations, if any). When the document is to be output, the process continues to step 214 where the output data in the document is captured and sent to the applet 168. For example, JavaScript functions can be invoked to capture the appropriate data in the document and send it to the applet (e.g., when the displayed control is selected by the user).

In step 216, the output data is sent from the applet 168 to the standalone application 160. Optionally, the applet can reformat the incoming output data into a desired format, such as a subset, sorting, etc; for example, only two out of the three columns of data displayed by the browser can be printed, or the data can be sorted or arranged in a different way, as based on server instructions and/or user preferences. If desired, the applet 168 can have been previously configured for desired functionality with the appropriate instructions in the page data from the server, e.g., to automatically flush the data to the non-standard output device, to buffer the data for eventual output, select one of many output devices, etc.

In step 218, the standalone application converts the output data to non-standard output data and sends the output data to the non-standard output device to be output, e.g., printed. In the described embodiment, the standalone application is a Java application that uses JavaPOS to communicate with the output device 156, but other languages and standards can be used in other embodiments. The process is then complete at 220.

In a different embodiment of the process of FIG. 4, the user can input data at the client 154 which the user then wants to output using the non-standard output device. For example, the user can send a request to the web application on server 152 to receive data as above, and after receiving the data the user annotates the data and wishes to output it in annotated form. The data and annotations can be formatted by the applet according to user guidelines and/or instructions from the server and output by the non-standard output device.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing non-standard input data from a non-standard input device to a standard browser having a program on a client in communication with the non-standard input device directly over a standard socket to a server having a configuring program over a network, the method comprising:
    receiving non-standard input data from the non-standard input device at the client;
    reading the received non-standard input data by one or more device drivers at the client which are associated with the non-standard input data;
    providing the read non-standard input data to an application at the client, the application opening the socket to the program and communicating with the non-standard input device;
    receiving from the application equivalent standard input data at the program and receiving from the configuring program configuration instructions to configure the program;
    providing received input data from the program to populate one or more respective fields in a browser form in relation to received configuration instructions; and
    sending the browser form to a web application on the server without the web application caching data.

2. The method of claim 1 further comprising generating page data on the server, the page data sent to the client to display a web page in the standard browser that receives the standard input data.

3. The method of claim 2 wherein the page data includes instructions for a program running in the standard browser to provide the standard input data into fields of the web page.

4. The method of claim 1 wherein the program running in the browser is a Java applet.

5. The method of claim 1 wherein the web page displayed by the standard browser is a form having at least one field into which the input data is placed by the program.

6. The method of claim 1 wherein the application is a Java application, and wherein the device drivers used to read the non-standard input device include JavaPOS.

7. The method of claim 1 wherein the program running in the browser is configured by data downloaded to the browser from the server.

8. The method of claim 7 wherein the browser displays a web form that is defined by the data downloaded from the server, the web form generated by a custom JSP tag on the server.

9. The method of claim 1 wherein the non-standard input device is a scanner.

10. The method of claim 1 wherein the non-standard input device is a magnetic stripe reader (MSR).

11. A method for providing output data to a non-standard output device from a document displayed by a standard browser having a program on a client in communication with the non-standard output device directly over a standard socket to a server, having a configuring program and a web application, over a network, the method comprising:
    receiving at the web application on the server a request from a user, the request requesting data to be sent from the server to a client in communication with the server;
    by the web application, providing the document including requested data and instructions;
    sending the requested data via the document and instructions to the client, the instructions governing how the data is to be output to a non-standard output device;
    receiving by a standard browser running on the client, requested data via the document and instructions capable of being outputted to the user;
    reading the received requested data and instructions by the program; and
    providing the requested data on the client to the non-standard output device, wherein the data can be sent according to the instructions to the non-standard output device to be output, the non-standard output device being in communication with the client, and the client having one or more device drivers associated with the non-standard output device and one or more platform-independent applications.

12. The method of claim 11 wherein the data is received from the standard browser by a standalone application running on the client and in communication with the non-standard output device, and further comprising sending the data from the standalone application to the non-standard output device.

13. The method of claim 12 wherein the browser is running a program that provides the data to the standalone application.

14. The method of claim 13 wherein the program running in the browser is a Java applet.

15. The method of claim 13 wherein the standalone application is a Java application, and wherein the device drivers used to output the document to the non-standard output device include JavaPOS.

16. The method of claim 11 wherein the non-standard output device is a receipt tape printer.

17. The method of claim 11 wherein the instructions provided to the client cause the standard browser to display a graphical control which, when selected by the user, causes at least a portion of the data to be sent to the non-standard output device for output independently of output functions of the browser.

18. The method of claim 11 wherein the instructions provided to the client cause the client to output the document at the non-standard output device without any input from a user of the client.

19. The method of claim 11 wherein the instructions provided to the client cause the client to display the document in the standard browser as well as output the document at the non standard output device.

20. The method claim 1 further comprising formatting the data into a predetermined format before sending the data to the non-standard output device.

* * * * *